United States Patent
Zhang et al.

(10) Patent No.: US 12,340,817 B2
(45) Date of Patent: Jun. 24, 2025

(54) AUDIO SIGNAL PROCESSING METHOD, TRAINING METHOD, APPARATUS AND STORAGE MEDIUM

(71) Applicant: Beijing Baidu Netcom Science Technology Co., Ltd., Beijing (CN)

(72) Inventors: Wenkai Zhang, Beijing (CN); Ce Zhang, Beijing (CN); Zheng Li, Beijing (CN); Lei Jia, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 371 days.

(21) Appl. No.: 17/812,784

(22) Filed: Jul. 15, 2022

(65) Prior Publication Data

US 2023/0197096 A1 Jun. 22, 2023

(30) Foreign Application Priority Data

Dec. 16, 2021 (CN) .......................... 202111541269.7

(51) Int. Cl.
  *G10L 15/22* (2006.01)
  *G10L 15/06* (2013.01)
  (Continued)

(52) U.S. Cl.
  CPC ........ *G10L 21/0224* (2013.01); *G10L 15/063* (2013.01); *G10L 15/22* (2013.01);
  (Continued)

(58) Field of Classification Search
  CPC ....... G10L 2021/02082; G10L 21/0208; G10L 25/30; G10L 2021/02166; G10L 21/0216;
  (Continued)

(56) References Cited

U.S. PATENT DOCUMENTS

| 2009/0089054 A1* | 4/2009 | Wang | H04M 9/082 704/E15.039 |
| 2015/0112672 A1* | 4/2015 | Giacobello | H04M 9/082 704/233 |

(Continued)

FOREIGN PATENT DOCUMENTS

| CN | 108550364 | 9/2018 |
| CN | 111402130 | 7/2020 |

(Continued)

OTHER PUBLICATIONS

First China Office Action corresponding to CN 2021115412697 dated Jul. 13, 2022.

(Continued)

*Primary Examiner* — Vijay B Chawan
(74) *Attorney, Agent, or Firm* — Husch Blackwell LLP

(57) ABSTRACT

Provided are an audio signal processing method, a training method, an apparatus and a storage medium, relating to the field of data processing, in particular to, the field of voice. The audio signal processing method includes: eliminating at least pail of a linear echo signal from a mixed voice signal, to obtain an intermediate processing signal, where the mixed voice signal is obtained by mixing a target voice signal with an echo signal, and the echo signal is generated in an environment where the target voice signal is located and includes the linear echo signal and a nonlinear echo signal; and removing the nonlinear echo signal and a residual part of the linear echo signal from the intermediate processing signal, by using a target full convolution neural network model, to obtain an approximate target voice signal, the target full convolution neural network model including at least two convolution layers.

16 Claims, 6 Drawing Sheets

S501: Acquiring an intermediate processing signal obtained by eliminating at least part of a linear echo signal from a mixed voice signal, the mixed voice signal being obtained by mixing a total sample target voice signal with an echo signal, and the echo signal including the linear echo signal and a nonlinear echo signal S502: Taking at least the intermediate processing signal as a training voice signal S503: Inputting the training voice signal to a preset full convolution neural network model for model training, to obtain a target full convolution neural network model, and the preset full convolution neural network model including at least two convolution layers

(51) Int. Cl.
  *G10L 21/0224* (2013.01)
  *G10L 25/30* (2013.01)
  *G10L 21/0208* (2013.01)

(52) U.S. Cl.
  CPC ........ *G10L 25/30* (2013.01); *G10L 2015/223* (2013.01); *G10L 2021/02082* (2013.01)

(58) Field of Classification Search
  CPC ............. G10L 21/0232; G10L 21/0272; G10L 21/0364; G10L 25/84; G10L 25/78; G10L 21/0224; G10L 15/22; G10L 2015/223; G10L 21/02
  See application file for complete search history.

(56) References Cited

U.S. PATENT DOCUMENTS

| | | | |
|---|---|---|---|
| 2019/0172476 A1* | 6/2019 | Wung | G10L 21/0232 |
| 2019/0222691 A1* | 7/2019 | Shah | G10L 21/0208 |
| 2019/0272842 A1* | 9/2019 | Bryan | G10L 21/0272 |

FOREIGN PATENT DOCUMENTS

| | | | | |
|---|---|---|---|---|
| CN | 111862931 | 10/2020 | | |
| CN | 111951819 | 11/2020 | | |
| CN | 111951819 A | * 11/2020 | ......... | G10L 21/0208 |
| CN | 112037809 | 12/2020 | | |
| CN | 112185352 | 1/2021 | | |
| CN | 113113038 | 7/2021 | | |
| CN | 113298225 | 8/2021 | | |
| CN | 113707167 | 11/2021 | | |

OTHER PUBLICATIONS

Third China Office Action corresponding to CN 2021115412697 dated Dec. 14, 2022.
European Search Report corresponding to EP 22183838.6 dated Dec. 13, 2022.
Chinese Excellent Master's degree thesis Information Science and Technology, Mar. 25, 2018, 7 pages.
Communication Technology, vol. 43, Wu Junqin et al., Apr. 2010, 3 pages.
Communication Electroacoustic Technology, Jan. 15, 2015, 7 pages.

* cited by examiner

AUDIO SIGNAL PROCESSING METHOD, TRAINING METHOD, APPARATUS AND STORAGE MEDIUM

CROSS-REFERENCE TO RELATED APPLICATIONS

The present application claims the priority from Chinese Patent Application No. 202111541269.7, filed with the Chinese Patent Office on Dec. 16, 2021, the content of which is hereby incorporated herein by reference in its entirety.

TECHNICAL FIELD

The present disclosure relates to a field of data processing technology, and in particular, to voice technology.

BACKGROUND

AEC (Acoustic echo cancellation) is a technology to eliminate acoustic echo between a speaker and a microphone. The acoustic echo is caused by a sound of the speaker being fed back to the microphone for many times. The AEC, as a front-end module of voice recognition, is essential in applications such as a car kit, an audio and video conference, a smart home and the like. Without an AEC module, the voice recognition is substantially unavailable in a scenario with large acoustic echo.

SUMMARY

The present disclosure provides an audio signal processing method and device, a training method and device, an apparatus, and a storage medium.

According to one aspect of the present disclosure, provided is an audio signal processing method including: eliminating at least part of a linear echo signal from a mixed voice signal, to obtain an intermediate processing signal; where the mixed voice signal is obtained by mixing a target voice signal with an echo signal, the echo signal is generated in an environment where the target voice signal is located and includes the linear echo signal and a nonlinear echo signal; and removing the nonlinear echo signal and a residual part of the linear echo signal from the intermediate processing signal, by using a target full convolution neural network model, to obtain an approximate target voice signal, where the target full convolution neural network model includes at least two convolution layers.

According to another aspect of the present disclosure, provided is a model training method including: acquiring an intermediate processing signal obtained by eliminating at least part of a linear echo signal from a mixed voice signal, where the mixed voice signal is obtained by mixing a total sample target voice signal with an echo signal, and the echo signal includes the linear echo signal and a nonlinear echo signal; taking at least the intermediate processing signal as a training voice signal; and inputting the training voice signal to a preset full convolution neural network model for model training to obtain a target full convolution neural network model, where the preset full convolution neural network model includes at least two convolution layers, and the target full convolution neural network model is able to remove the nonlinear echo signal and a residual part of the linear echo signal from the intermediate processing signal.

According to another aspect of the present disclosure, provided is an audio signal processing device including: a linear echo processing unit configured to eliminate at least part of a linear echo signal from a mixed voice signal, to obtain an intermediate processing signal, where the mixed voice signal is obtained by mixing a target voice signal with an echo signal, and the echo signal is generated in an environment where the target voice signal is located and includes the linear echo signal and a nonlinear echo signal; and a neural network processing unit configured to remove the nonlinear echo signal and a residual part of the linear echo signal from the intermediate processing signal, by using a target full convolution neural network model, to obtain an approximate target voice signal, where the target full convolution neural network model includes at least two convolution layers.

According to another aspect of the present disclosure, provided is a model training device including: a data acquisition unit configured to acquire an intermediate processing signal obtained by eliminating at least part of a linear echo signal from a mixed voice signal, where the mixed voice signal is obtained by mixing a total sample target voice signal with an echo signal, and the echo signal includes the linear echo signal and a nonlinear echo signal; a training data determination unit configured to take at least the intermediate processing signal as a training voice signal; and a model optimization unit configured to input the training voice signal to a preset full convolution neural network model for model training, to obtain a target full convolution neural network model, where the preset full convolution neural network model includes at least two convolution layers, and the target full convolution neural network model is able to remove the nonlinear echo signal and a residual part of the linear echo signal from the intermediate processing signal.

According to another aspect of the present disclosure, provided is an electronic apparatus including at least one processor; and a memory connected in communication with the at least one processor. The memory stores an instruction executable by the at least one processor, and the instruction, when executed by the at least one processor, enables the at least one processor to execute any one of the methods described above.

According to another aspect of the present disclosure, provided is a non-transitory computer-readable storage medium on which a computer instruction is stored. The computer instruction is used to cause a computer to execute any one of the methods described above.

According to another aspect of the present disclosure, provided is a computer program product including a computer program, and when the computer program is executed by a processor, any one of the methods described above is implemented.

In this way, the present disclosure can maximize the eliminating of the linear echo signal and the nonlinear echo signal in the mixed voice signal, and lay a foundation for effective voice recognition.

It should be understood that the contents described in this part is not intended to identify key or important features of embodiments of the present disclosure, nor is it used to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those of ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

Taking a smart speaker in a home scenario as an example, when a user sends a voice command to the smart speaker while the smart speaker is playing audio, audio recorded by a microphone of the smart speaker is mixed audio, that is an echo (e.g., the audio played by the smart speaker being fed back to the microphone for many times) mixed with the voice command. At this time, without an AEC module, the smart speaker is difficult to recognize the voice command due to an influence of the echo, resulting in the user's voice command cannot be responded to, which will inevitably affect use experience.

An AEC scheme generally estimates an echo signal through a mixed signal (i.e., a mixed voice signal) recorded by the microphone and a signal (i.e., a remote-end signal) played by the speaker, thereby eliminating the echo signal in the mixed signal. The AEC scheme described in the present disclosure is mainly divided into a linear scheme and a nonlinear scheme, that is, the present disclosure aims to combine the linear scheme and the nonlinear scheme to propose a two-stages AEC scheme, in this way, an effect of eliminating both a linear echo (i.e., a linear echo signal) and a nonlinear echo (i.e., a nonlinear echo signal) is achieved, and voice recognition accuracy is improved. Moreover, the present disclosure also has a scenario generalization ability and stable performance in an extreme scenario. In addition, the present disclosure may greatly save resources such as manpower, time, operation and the like.

Figure 1:
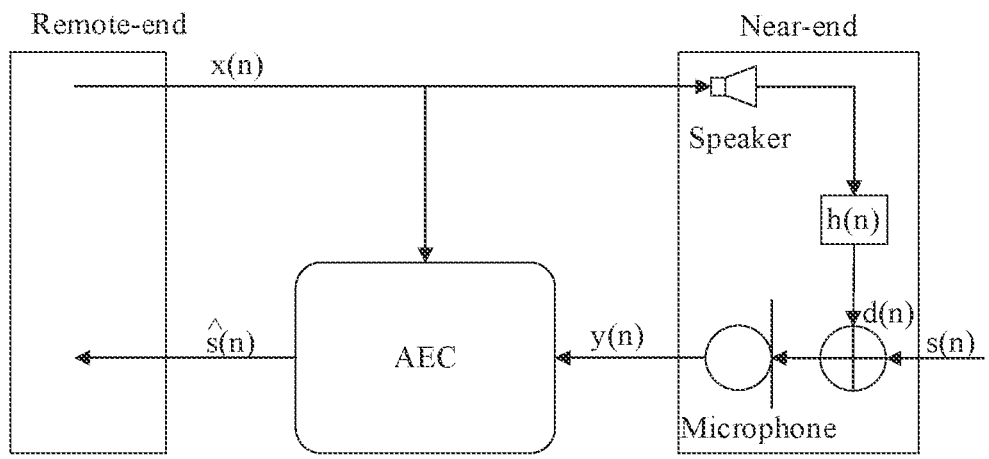
FIG. 1 (a) and FIG. 1 (b) are schematic diagrams of an implementation principle of a AEC scheme under one specific scenario according to embodiments of the present disclosure.
Figure 1:
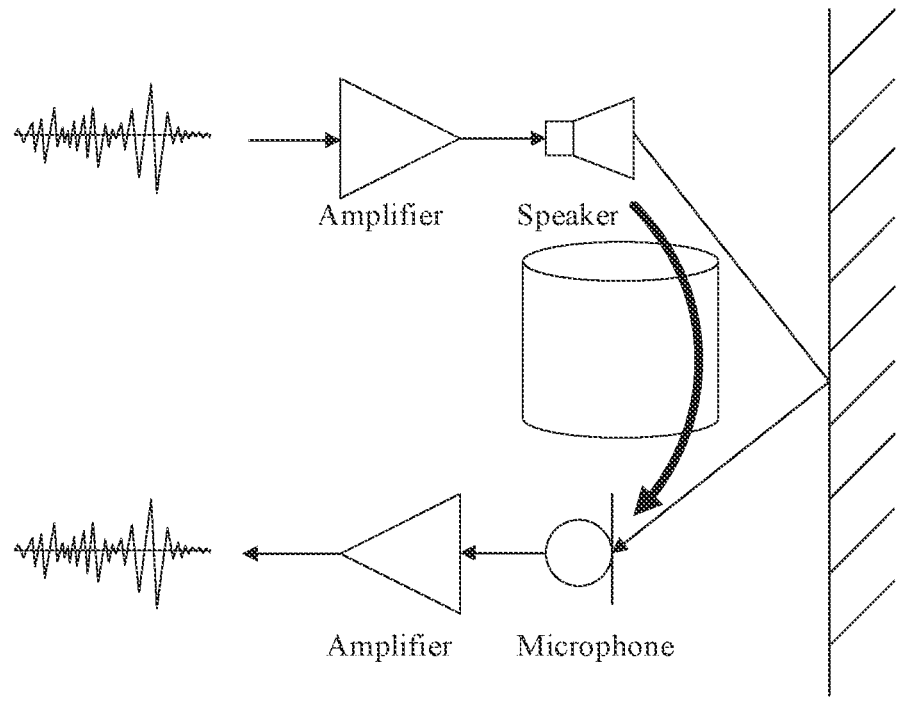

Here, the AEC scheme in the present disclosure will be firstly described in detail. Here, a transfer function is firstly introduced, specifically, a process of the remote-end signal being fed back to the microphone is called the transfer function of an actual echo transmission path in the AEC scheme. The echo signal may be estimated by estimating the transfer function. The transfer function is not a simple linear function, but also contains a nonlinear part. Based on these, definition of an AEC scheme problem is shown in FIG. 1 (a).

A signal y(n) (the y(n) is the mixed voice signal) received by the microphone is composed of a near-end voice signal s(n) (i.e., a target voice signal, e.g., the target voice signal is the voice command sent by the user, correspondingly to a recognition scenario) and an echo signal d(n), the echo signal d(n) is generated by convolution of a remote-end signal x(n) and a transfer function h(n) of the actual echo transmission path. Based on these, combined with the following formula (1) and formula (2), a goal of the AEC scheme is to estimate the h(n) by using the mixed voice signal y(n) and the remote-end signal x(n) and finally obtain an approximate target voice signal s(n) after the echo being eliminated. The formula (1) and formula (2) are respectively:

$$d(n)=x(n)*h(n) \qquad \text{formula (1);}$$

$$y(n)=d(n)+s(n) \qquad \text{formula (2).}$$

Further, it can be seen from FIG. 1 (b), an acoustic echo (i.e., the echo signal) is caused by a sound of the speaker being fed back to the microphone for many times, and includes a linear part. (i.e., the linear echo signal which may be referred to as the linear echo for short) and a nonlinear part (i.e., the nonlinear echo signal which may be referred to as the nonlinear echo for short). The linear echo signal is mainly reflection of the audio played by the speaker in the room recorded by the microphone, the nonlinear echo signal is caused by distortion due to an amplifier and mechanical vibration due to the audio played by the speaker inside the container being fed back to the microphone.

Figure 2:
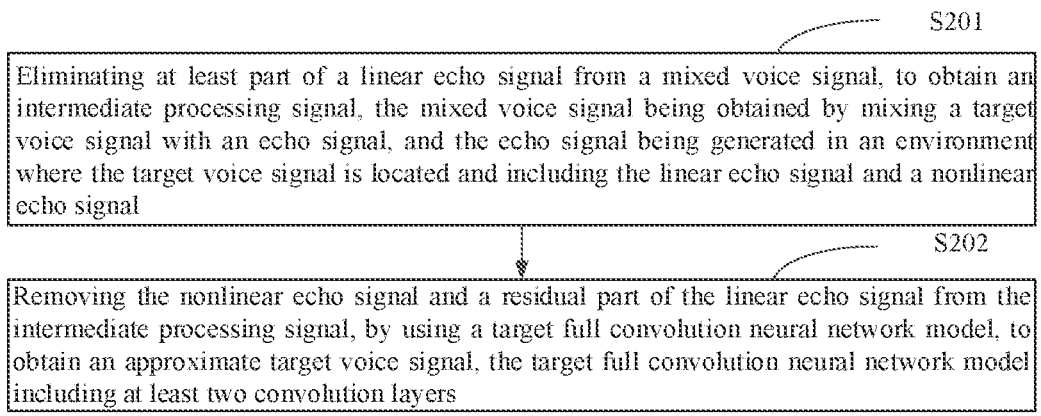
FIG. 2 is a schematic diagram of an implementation flow of an audio signal processing method according to embodiments of the present disclosure.

Based on these, the present disclosure provides a scheme for two-stages elimination of the echo signal described above, specifically, provides an audio signal processing method, as shown in FIG. 2, including the follows.

In S201, at least part of the linear echo signal is eliminated from the mixed voice signal, to obtain an intermediate processing signal. the mixed voice signal is obtained by mixing the target voice signal and the echo signal, the echo signal is generated in an environment where the target voice signal is located and includes the linear echo signal and the nonlinear echo signal. In a specific example, the echo signal is the acoustic echo referred to in FIG. 1 (b). Further, the echo signal is generated by the remote-end signal shown in FIG. 1 (a).

In S202, the nonlinear echo signal and a residual part of the linear echo signal are removed from the intermediate processing signal, by using a target full convolution neural network model, to obtain the approximate target voice signal, and the target full convolution neural network model includes at least two convolution layers.

In this way, after the part of the linear echo signal is eliminated, the nonlinear echo signal and the residual part of the linear echo signal in the intermediate processing signal obtained after eliminating the part of the linear echo signal elimination are further eliminated by using the target full convolution neural network model, thus, the approximate target voice signal is obtained, and effective elimination of the echo signal is realized, moreover, a problem that effective recognition cannot be realized due to the echo is avoided.

Moreover, since the present disclosure realizes the effective elimination of the linear echo signal and the nonlinear echo signal, and also adopts the target full convolution neural network model, the present disclosure has a strong scenario generalization ability and the stable performance in the extreme scenario. Meanwhile, the present disclosure may also greatly save resources such as manpower, time, operation and the like.

In addition. the target full convolution neural network model in the present disclosure mainly uses the convolution layers, therefore, compared with other existing schemes, the present disclosure does not impose any time limit on audio used for reasoning (such as mixed voice data), moreover, during the above process, there is no need to do any reset operation or the like, thus the process is simple and efficient.

In one specific example of the present disclosure, after obtaining the approximate target voice signal, voice recognition ray be performed on the approximate target voice signal to obtain a control instruction (i.e., the voice command) indicated by the target voice signal, and then the control instruction is responded to.

In this way, since the present disclosure effectively eliminates the linear voice signal and the nonlinear voice signal, the voice recognition accuracy is greatly improved, thus the user experience is ensured, and the user experience is also improved. Moreover, since the present disclosure can greatly improve the voice recognition accuracy, an application scenario of a product to which the present disclosure is applied (for example, the smart speaker) is not limited, so that the present disclosure also widens an application scope of a corresponding product.

In one specific example of the present disclosure, there are at least two convolution layers with different processing parameters in the target full convolution neural network model, and a processing parameter of a convolution layer includes at least one of a quantity of channels, or a convolution kernel. That is, there are at least two convolution layers in the target full convolution neural network model, and the processing parameters of the at least two convolution layers are different from each other, in other words, the processing parameters of the convolution layers in the target full convolution neural network model are not exactly the same with each other, in this way, multi-scales convolution is realized, and the convolution layers have receptive fields of different sizes, thus different features are extracted, and a foundation for improving the scenario generalization ability and stability of the scheme is laid.

In one specific example of the present disclosure, quantities of channels of the convolution layers contained in the target full convolution neural network model have one of: an increasing trend, a decreasing trend, or a trend of increasing first and then decreasing. In other words, the quantities of the channels of a first convolution layer, a second convolution layer, . . . , an M-th convolution layer in the target full convolution neural network model has the increasing trend (such as an inverted pyramid structure), the decreasing trend (such as a pyramid structure), or the trend of increasing first and then decreasing. Here, the M is an integer greater than or equal to 2, in this way, the multi-scales convolution is realized, so that the convolution layers have the receptive fields of different sizes, and thus the different features are extracted, and the foundation for improving the scenario generalization ability and the stability of the scheme is laid.

In one specific example of the present disclosure, the above method of removing the nonlinear echo signal and the residual part of the linear echo signal from the intermediate processing signal, by using the target full convolution neural network model, may specifically include: inputting the intermediate processing signal to the target full convolution neural network model, or, inputting an audio characteristic of the intermediate processing signal to the target full convolution neural network model. A convolution layer in the target full convolution neural network model is able to perform convolution processing on an audio frame in the intermediate processing signal, and remove the nonlinear echo signal and the residual part of the linear echo signal from the intermediate processing signal.

That is, the present disclosure may directly input the intermediate processing signal to the target full convolution neural network model, or, input the audio characteristic of the intermediate processing signal to the target full convolution neural network model, in this Way, a more flexible processing method is provided. Moreover, since the convolution layers of the target full convolution neural network model is fully utilized to further eliminate the nonlinear echo signal and the residual part of the linear echo signal in the intermediate processing signal to obtain the approximate target voice signal, the effective elimination of the echo signal is realized, meanwhile, the problem that the effective recognition cannot be realized due to the echo is also avoided. Moreover, the present disclosure also has the strong scenario generalization ability and the stable performance in the extreme scenario. Meanwhile, the present disclosure may also greatly save the resources such as manpower, time, operation and the like.

In one specific example of the present disclosure, the audio frame on which the convolution processing is performed by the convolution layer in a time dimension includes: a t-th audio frame at time t, a (t−1)-th audio frame at time t−1, . . . , and a (t−N)-th audio frame at time t-N. The N is related to a kernel characteristic of a convolution kernel of the convolution layer in the time dimension, and the N is an integer greater than or equal to 1; and the t is an integer greater than or equal to 1, and the time t is the current time. For example, the N is equal to a kernel quantity of the convolution kernel in the time dimension minus 1. For example, the quantity of the convolution kernel in the time dimension is 3, at this time, N is 2.

It should be noted that, in practical application, all the convolution layers in the target full convolution neural network model may process the audio frames by adopting the above manner or, at least one of the layers processes the audio frames in by adopting the above manner.

In this way, each convolution layer of the present disclosure may process normally and perform normal performance without relying on an audio frame at future time when performing the convolution processing. That is, when the convolution processing is performed on the t-th audio frame at time t (i.e., the current time), the convolution processing depends on the (t−1)-th audio frame at time t−1 to the (t−N)-th audio frame at time t-N, instead of depending on a (t+1)-th audio frame at time t1 (i.e., the future time of the current time). Therefore, zero delay is realized during the convolution processing.

Figure 3:
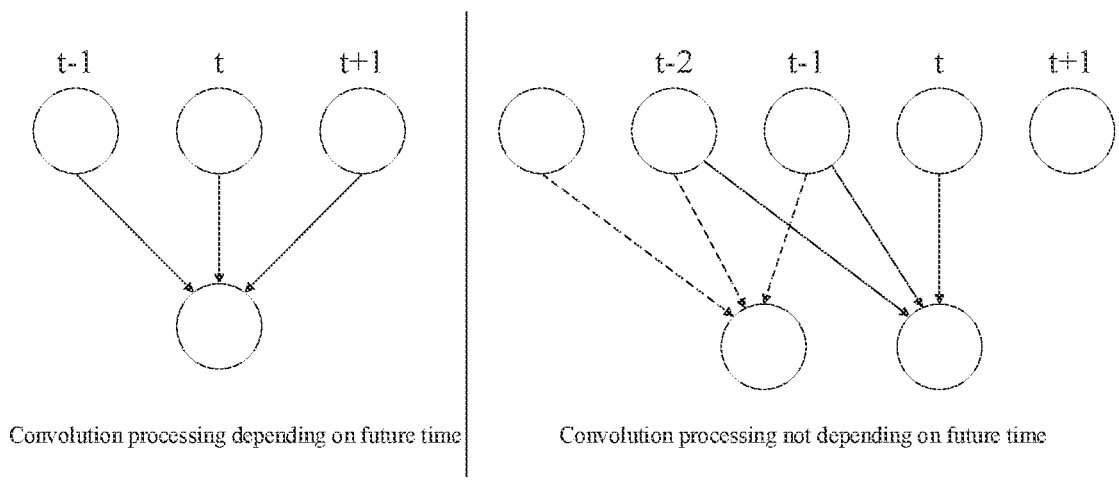
FIG. 3 is a comparative schematic diagram of a convolution processing in one specific example according to embodiments of the present disclosure, FIG. 4 (a) and FIG. 4 (b) are schematic diagrams of a processing flow of an audio signal processing method in one specific example according to embodiments of the present disclosure.

For example, as shown in FIG. 3, the time t is the current time, it is assumed that the kernel quantity of the convolution kernel in the time dimension is 3, at this time, as shown on the left side of FIG. 3, the convolution processing at the current time depends on the audio frames at the time t−1 and the time t−1, therefore, the zero delay cannot be realized. But the scheme adopted in the present disclosure is shown on the right side of FIG. 3, the convolution processing at the current time depends on the audio frames at the time t−1, time t−2 and the current time (i.e., the time t), instead of depending on the audio frame at the time t+1, therefore, the present disclosure realizes the zero delay during the convolution processing.

In one specific example of the present disclosure, when a value of t is 1, a 1-st audio frame represents a first audio frame in the intermediate processing signal, and a 0-th audio frame to a (1−N)-th audio frame are preset frames. That is, in order to ensure the zero delay in the convolution processing, in a case where the first audio frame is the audio frame at the current time, that is a case before the convolution processing is performed on the first audio frame by the convolution layers, since there are no other audio frames before the first audio frame, in order to ensure normal operation of the convolution processing, N preset frames need to be added to make the convolution processing be performed on the added preset frames and the audio frame at the current time, to ensure the normal convolution processing of convolution layers. In one specific example, the preset frames may be zero.

Further, the method further includes: setting the N preset frames before the first audio frame in the intermediate processing signal, to update the intermediate processing signal, so that the first N frames of the updated intermediate processing signal are the preset frames.

In this way, the normal operation of the convolution processing of convolution layers is ensured. Meanwhile, a convolution result only depends on historical time and the current time, instead of depending on the future time, thus the zero delay is realized.

It should be noted, in practical application, the intermediate processing signal input to the target full convolution neural network model is the updated signal, in other words, the intermediate processing signal input to the target full convolution neural network model is the intermediate processing signal with N preset frames set in the above manner. For example, the updated intermediate processing signal is directly input to the target full convolution neural network model, or the audio characteristic of the updated intermediate processing signal is input into the target full convolution neural network model, so as to ensure that the convolution processing does not depend on the future time, so as to achieve the zero delay.

It should be noted that, in practical application, before the convolution processing of each convolution layer, the N preset frames need to be preset in the above manner, in this way, the normal operation of the convolution processing of the convolution layers is ensured, meanwhile, the convolution result only depends on the historical time and the current time, without relying on the future time, thus the zero delay is realized.

In one specific example, the convolution layers described in the present disclosure may be specifically a MobileNet structure, in this way, grouping convolution is realized through the MobileNet, in this way, while ensuring an ability of extracting features, an amount of parameters is greatly reduced.

It should be noted that, the target full convolution neural network model described in the present disclosure is obtained by training according to a model training method described below, a training process of the target full convolution neural network model may refer to the following contents, it will not be repeated here.

In one specific example of the present disclosure, the linear echo signal may be eliminated in the following manner. specifically, the eliminating of the at least part of the linear echo signal from the mixed voice signal to obtain the intermediate processing signal as described above specifically includes: estimating an approximate linear echo signal in the environment where the mixed voice signal is located, and eliminating the estimated approximate linear echo signal from the mixed voice signal to obtain the intermediate processing signal.

In this way, maximizing the eliminating of the linear part in the echo signal by estimating the approximate linear echo signal lays a foundation for maximizing the eliminating of the echo signal in a following process, and also lays a foundation for improving a recognition preparation rate in the following process. Moreover, since the approximate linear echo signal estimated by the present disclosure is the linear echo signal in the environment where the mixed voice signal is located, the linear scheme of the present disclosure may be self-adaptive to the current environment, and have the strong generalization ability.

In one specific example of the present disclosure, the approximate linear echo signal may be estimated in the following manner, specifically, the estimating of the approximate linear echo signal in the environment where the mixed voice signal is located specifically includes: inputting a remote-end signal for generating the echo signal and the mixed voice signal into a linear echo model (such as a self-adaptive linear filter integrated with a self-adaptive algorithm), to obtain the approximate linear echo signal. Here, the linear echo model may optimize a parameter in real time based on the currently input mixed voice signal and the remote-end signal for generating the echo signal, and optimize the parameter to an optimal value, the optimal value matches with the environment where the current mixed voice signal is located.

For example, in practical application, the linear echo model may optimize its own parameter in real-time based on the currently obtained mixed voice signal and the remote-end signal. For example, for a mixed voice signal with P frames and the remote-end signal, first p frames are used to adjust the parameter, the adjusting make the parameter reach a stable state, that is, the parameter is adjusted to the optimal value, in rear P-p frames, audio of the rear P-p frames is processed based on the stable parameter (i.e., the optimal value). In other words, the linear echo model may timely adjust and update the parameter based on the currently input voice signal, and reach the stable state, and match with the current scenario in this way. thereby obviously improving the generalization ability of the linear echo model.

Here, the linear scheme is further described in detail with reference to FIG. 4 (*a*) and FIG. 4 (*b*), specifically, the linear scheme uses a linear filter (i.e., the self-adaptive linear filter (i.e., a self-adaptive filter)) to estimate a linear transfer function, the approximate linear echo signal may be estimated after the remote-end signal is processed by the linear transfer function.

Specifically, the linear echo model (i.e., a linear module) described in the present disclosure uses a linear self-adaptive filtering algorithm (hereinafter referred to as the self-adaptive algorithm) to adjust a weight of the self-adaptive filter (i.e., a parameter value of the parameter), then estimates an approximate echo path after the parameter reaches the optimal value to approximate a real echo path, and thus estimates the approximate linear echo signal, and removes the estimated approximate linear echo signal from the mixed voice signal. In this way, the linear echo signal is eliminated to the greatest extent. Specifically, a principle of the model training method is shown in FIG. 4 (a), and FIG. 4 (b).

Figure 4A:
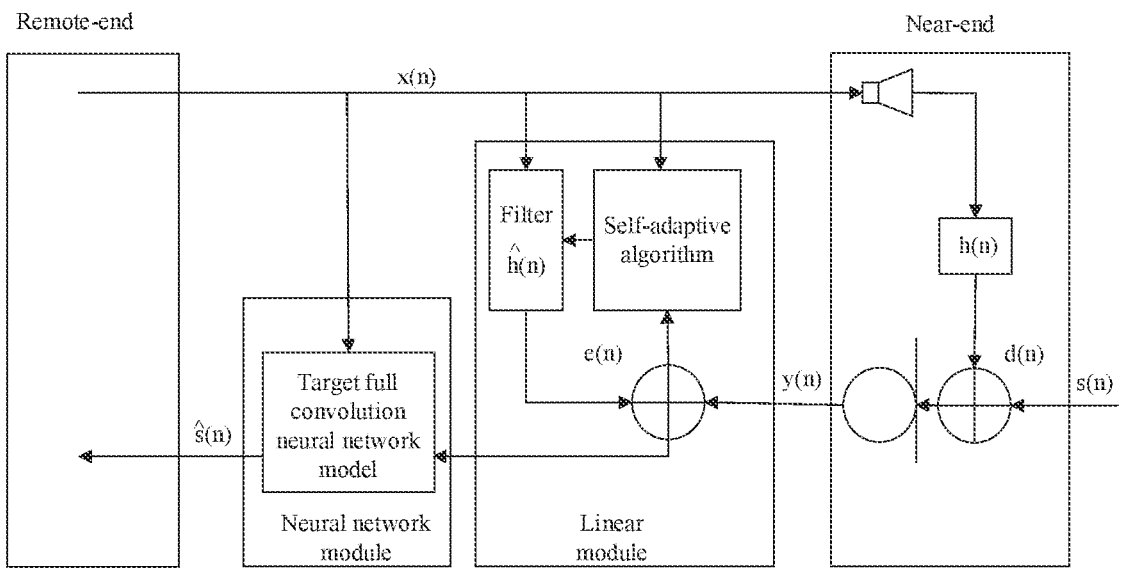
Figure 4B:
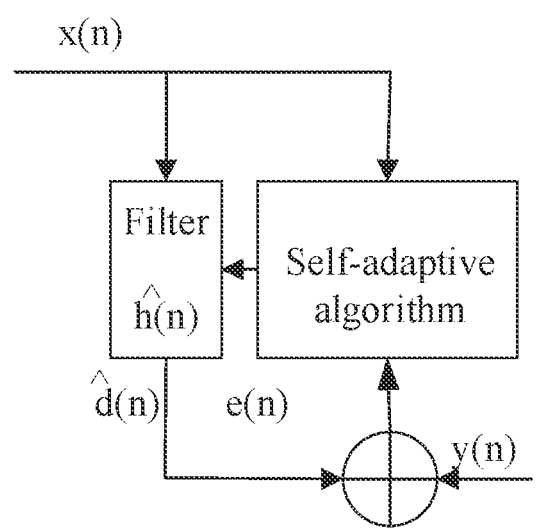

The remote-end signal x(n) passes through the self-adaptive filter (referred to as the filter in FIG. 4 (a) and FIG. 4 (b)) ĥ(n) (which is the linear transfer function) to estimate the approximate linear echo signal d̂(n), the approximate linear echo signal d̂(n) is subtracted from the mixed voice signal y(n) to obtain an error signal e(n). Specific formulas are as follows:

$$\hat{d}(n)=x(n)*\hat{h}(n) \quad \text{formula (3);}$$

$$e(n)=y(n)-\hat{d}(n) \quad \text{formula (4).}$$

Here, by minimizing the error signal, the parameter of the self-adaptive filter may be adjusted and optimized, in this way, the approximate linear echo signal estimated by the self-adaptive filter is closer to an actual echo path.

It should be noted that, the mixed voice signal y(n)=the echo signal d(n)+the target voice signal s(n), based on this, the formula (4) can be specifically expressed as:

$$e(n)=d(n)+s(n)-\hat{d}(n) \quad \text{formula (5).}$$

Here, the target voice signal s(n) may be understood as a constant, for example, when s(n)=0, according to the formula (5), minimizing e(n) (which is equivalent to minimizing d(n)-d̂(n)) makes the approximate linear echo signal d(n) estimated by the self-adaptive filter maximize a proximity to a real linear echo path.

In one specific example, according to different optimization criteria, the linear self-adaptive filtering algorithm described in the present disclosure may adopt any one of a recursive least square algorithm (RLS), a least mean square error algorithm (LMS), a normalized mean square error algorithm (NLMS), or the like.

In this way, the linear eliminating scheme also has the generalization ability, so as to maximize the eliminating of a linear echo part in the mixed voice signal, and it lays a foundation for ensuring echo eliminating performance in any scenario. Moreover, the linear scheme described in the present disclosure, compared with a traditional filter with a fixed parameter, may be adjusted self-adaptively with a change of the environment. Therefore, compared with an existing filter with the fixed parameter, the linear scheme in the present disclosure also has the strong generalization ability.

Thus, the present disclosure adopts the two-stages AEC mode, that is, the present disclosure eliminates the part of the linear echo signal by adopting the linear module, and eliminates the residual nonlinear echo signal and the residual part of the linear echo signal by adopting the neural network module (i.e., the target full convolution neural network model).

Moreover, the linear module also adopts the self-adaptive algorithm and is connected in series with the neural network module, in this way, the series connection of the present disclosure combines advantages of linear AEC and neural network AEC, also has the strong generalization ability, and breaks limitations of the scenario, while ensuring the eliminating of the linear echo and the nonlinear echo.

Figure 5:
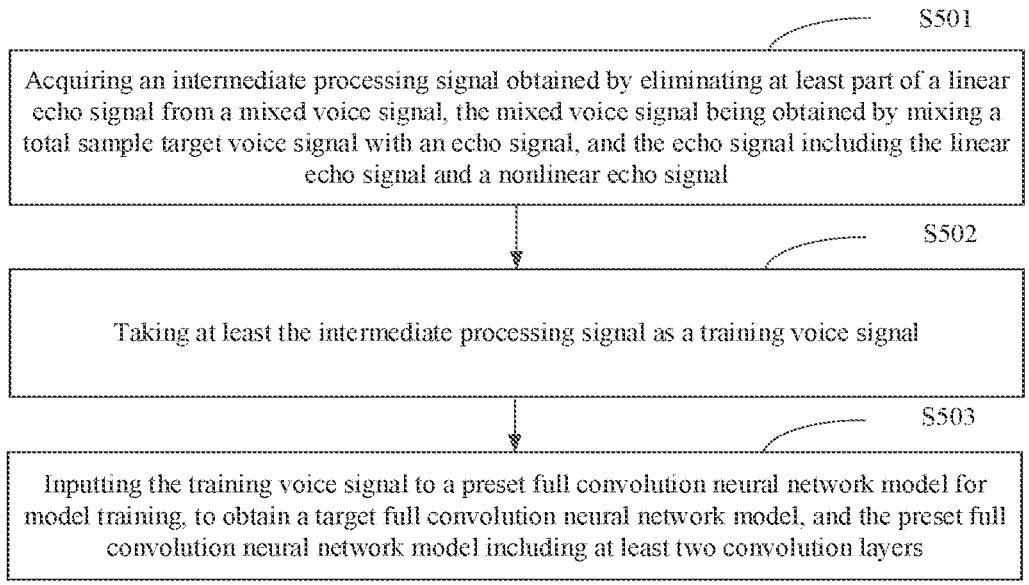
FIG. 5 is a schematic diagram of an implementation flow of a model training method according to embodiments of the present disclosure.

The present disclosure also provides a model training method, specifically, as shown in FIG. 5, the method includes the follows.

In S501, an intermediate processing signal obtained by eliminating at least part of a linear echo signal from a mixed voice signal is acquired, the mixed voice signal is obtained by mixing a total sample target voice signal with an echo signal, and the echo signal includes a linear echo signal and a nonlinear echo signal.

It can be understood that, the echo signal here has the same generation principle as the echo signal mentioned in the audio signal processing method described above, except for that the echo signal in this example may be an echo signal generated by simulating under an environment where the total sample target voice signal is located during a process of model training. For example, the echo signal simulated in this example is the acoustic echo referred to in FIG. 1 (b). Further, the echo signal simulated in this example is generated by simulating the remote-end signal shown in FIG. 1 (a).

In S502, at least the intermediate processing signal is taken as a training voice signal.

In S503, the training voice signal is input to a preset full convolution neural network model for model training, to obtain a target full convolution neural network model, and the preset full convolution neural network model includes at least two convolution layers.

Here, the target full convolution neural network model obtained after training is able to remove the nonlinear echo signal and a residual part of the linear echo signal from the intermediate processing signal.

In this way, in the process of the model training, the intermediate processing signal after eliminating the part of the linear echo signal by using a linear scheme is taken as training data, thus, it lays a foundation for obtaining the target full convolution neural network model which may maximize the eliminating of an echo. Moreover, the preset full convolution neural network model trained by the present disclosure mainly uses the convolution layers, therefore, compared with other existing schemes, the present disclosure does not limit audio used for training, moreover, in during the process, there is no need to do any reset operation or the like, thus the process is simple and efficient.

In one specific example of the present disclosure, the mixed voice signal used in the process of the training may also be obtained in the following way, that is the way of splicing a plurality of sample target voice signals (i.e., a plurality of voice commands as samples), to obtain the total sample target voice signal, and mixing the total sample target voice signal with the echo signal, to obtain the mixed voice signal. Here, considering that updating a filter parameter of a linear module takes several seconds to be stable, it is necessary to control training audio to be long enough, in order to ensure accuracy of data used for training is not affected by the updating of filter parameter, otherwise, the subsequent neural network module will not be able to obtain audio output by the linear module under normal performance, resulting in mismatch between training and real use. Therefore, in order to fully ensure stability of performance and accuracy of a training result, the present disclosure splices a plurality of sample audio (i.e., the sample target voice signals) to ensure normal output of the linear module, thereby laying a foundation for improving accuracy of the model training.

In one specific example of the present disclosure, the linear echo signal may be eliminated in the following way to obtain the intermediate processing signal required for the model training, the way specifically includes estimating an approximate linear echo signal in an environment where the mixed voice signal is located, eliminating the estimated approximate linear echo signal from the mixed voice signal to obtain the intermediate processing signal, and then taking the intermediate processing signal obtained after eliminating the part of the linear echo signal as the training data (i.e., the training voice signal).

In this way, by estimating the approximate linear echo signal to maximize the eliminating of a linear part of the echo signal, the preset full convolution neural network model is provided with the training data; meanwhile, a foundation for maximizing the eliminating of the echo signal is laid. Besides, since the approximate linear echo signal estimated by the present disclosure is the linear echo signal under the environment where the mixed voice signal is located, the linear scheme of the present disclosure may also be self-adaptive to the current environment, has a strong generalization ability, and also lays a foundation for further improving a generalization ability of the target full convolution neural network model obtained by the training.

In one specific example of the present disclosure, the approximate linear echo signal (that is, the approximate linear echo signal estimated under the environment where the mixed voice signal is located) may be estimated in the following way, the way specifically includes: inputting a remote-end signal for generating the echo signal and the mixed voice signal into a linear echo model (such as a self-adaptive linear filter integrated with a self-adaptive algorithm), to obtain the approximate linear echo signal. Here, the linear echo model may optimize a parameter in real time based on the currently input mixed voice signal and the remote-end signal for generating the echo signal, and optimize the parameter to an optimal value, the optimal value matches the environment where the current mixed voice signal is located.

It should be noted that, the intermediate processing signal used in the model training method described in the present disclosure is an output result of the linear module (i.e., the linear echo model).

For example, in practical application, the linear echo model may optimize its own parameter in real-time based on the currently obtained mixed voice signal and the remote-end signal. For example, for a mixed voice signal with P frames and the remote-end signal, first p frames are used to adjust the parameter, the adjusting make the parameter reach a stable state, even if the parameter is adjusted to the optimal value, in rear P-p frames, audio of the rear P-p frames is processed based on the stable parameter (i.e., the optimal value). In other words, the linear echo model may timely adjust and update the parameter based on the current input voice signal, and reach the stable state, and match with the current scenario in this way, thereby obviously improving the generalization ability of the linear echo model.

Here, the linear scheme will be further described in detail with reference to FIG. 4 (a) and FIG. 4 (b), specifically, the linear scheme uses a linear filter (i.e., the self-adaptive linear filter (i.e., a self-adaptive filter)) to estimate a linear transfer function, and the approximate linear echo signal may be estimated after the remote-end signal is processed by the linear transfer function.

Specifically, the linear echo model (i.e., the linear module) described in the present disclosure uses a linear self-adaptive filtering algorithm (hereinafter referred to as the self-adaptive algorithm) to adjust a weight of the self-adaptive filter (i.e., a parameter value of the parameter), then estimates an approximate echo path after the parameter reaches the optimal value to approximate a real echo path, and thus estimates the approximate linear echo signal, and removes the estimated approximate linear echo signal from the mixed voice signal. In this way, the linear echo signal is eliminated to the greatest extent. Specifically, a principle of the model training is shown in FIG. 4 (a) and FIG. 4 (b).

The remote-end signal x(n) passes through the self-adaptive filter (referred to as the filter in FIG. 4 (a) and FIG. 4 (b)) ĥ(n) (which is the linear transfer function) to estimate the approximate linear echo signal â(n), the approximate linear echo signal â(n) is subtracted from the mixed voice signal y(n) to obtain the error signal e(n). Specific formulas are as follows:

$$\hat{d}(n)=x(n)*\hat{h}(n) \qquad \text{formula (3);}$$

$$e(n)=y(n)-\hat{d}(n) \qquad \text{formula (4).}$$

Here, by minimizing the error signal, the parameter of the self-adaptive filter may be adjusted and optimized, in this way, the approximate linear echo signal estimated by the self-adaptive filter is closer to an actual echo path.

It should be noted that, the mixed voice signal y(n)=the echo signal d(n)+the target voice signal s(n), based on this, the formula (4) can be specifically expressed as:

$$e(n)=d(n)+s(n)-\hat{d}(n) \qquad \text{formula (5).}$$

Here, the target voice signal s(n) may be understood as a constant, for example, when s(n)=0, according to the formula (5), minimizing e(n) (which is equivalent to minimizing d(n)−â(n) makes the approximate linear echo signal estimated by the self-adaptive filter â(n) maximize a proximity to a real linear echo path.

In one specific example, according to different optimization criteria, the linear self-adaptive filtering algorithm described in the present disclosure may adopt any one of a recursive least square algorithm (RLS), a least mean square error algorithm (LMS), a normalized mean square error algorithm (NLMS), or the like.

In this way, the linear eliminating scheme also has the generalization ability, so as to maximize the eliminating of the linear echo part in the mixed voice signal, and it lays a foundation for ensuring echo eliminating performance in any scenario. Moreover, the linear scheme described in the present disclosure, compared with a traditional filter with a fixed parameter, may be adjusted self-adaptively with a change of the environment. Therefore, compared with an existing filter with the fixed parameter, the linear scheme in the present disclosure also has the strong generalization ability.

Moreover, the present disclosure adopts joint optimization of two modules in which the linear module and the neural network module are connected in series, an output of the linear module is taken as an input of the neural network module in the process of the training, so that the neural network module may perform iterative optimization based on the output result of the linear module to eliminate a remaining part of the echo signal, such as eliminating a nonlinear echo part and a residual linear echo part, in this way, it lays a foundation for maximizing the eliminating of echo signal.

It should be rioted that, the joint optimization process of the two modules is mainly reflected in that the updating of a parameter of a nonlinear module (i.e., the neural network module) is affected by the output result of the linear module, in other words, the input of the nonlinear module (i.e., the neural network module) is obtained after a part of the echo being eliminated by the linear module, that is the input of the nonlinear module is the output of the linear module, the updating of the parameter of the linear module is not affected by the nonlinear module. Therefore, compared with separate optimizations of the two modules, the present disclosure effectively avoids a problem due to that the two modules cannot match with each other and thus a performance is affected, further lays a foundation for maximizing echo eliminating.

In one specific example of the present disclosure, taking at least the intermediate processing signal as the training voice signal includes one of: taking the intermediate processing signal and the mixed voice signal as the training voice signal, taking an audio characteristic of the intermediate processing signal and an audio characteristic of the mixed voice signal as the training voice signal, taking the intermediate processing voice signal and the remote-end signal as the training voice signal, or taking an audio characteristic of the intermediate processing signal and an audio characteristic of a remote-end signal as the training voice signal. The remote-end signal is used to generate the echo signal.

That is, the training voice signal of the present disclosure may also include the mixed voice signal or the remote-end signal. The training data input to the preset full convolution neural network model may be the training voice signal, or may be the audio characteristic of the training voice signal. Specifically, data as the training voice signal may be divided into the following four categories.

The first category includes taking the intermediate processing signal and the mixed voice signal as the training voice signal.

The second category includes taking the audio characteristic of the intermediate processing signal and the audio characteristic of the mixed voice signal as the training voice signal.

The third category includes taking the intermediate processing signal and the remote-end signal as the training voice signal.

The fourth category includes taking the audio characteristic of the intermediate processing signal and the audio characteristic of the remote-end signal as the training voice signal.

In practical application, one of the above four categories may be used, the training may be completed as long as a preset labeled voice signal is made for a specific category.

In this way, a more flexible processing method is provided, meanwhile, data support is provided for effectively completing the training of the preset full convolution neural network model.

In one specific example of the present disclosure, there are at least two convolution layers with different processing parameters in the preset full convolution neural network model, and a processing parameter of a convolution layer includes at least one of a. quantity of channels. or a convolution kernel. That is, there are at least two convolution layers in the preset full convolution neural network model, and the processing parameters of the at least two convolution layers are different from each other, in other words, the processing parameters of the convolution layers in the preset full convolution neural network model are not exactly the same with each other, in this way, multi-scales convolution is realized, and the convolution layers have receptive fields of different sizes, thus different features are extracted, and a foundation for improving the scenario generalization ability the stability of the scheme is laid.

In one specific example of the present disclosure, quantities of channels of the convolution layers contained in the target full convolution neural network model have one of: an increasing trend, a decreasing trend, or a trend of increasing first and then decreasing. In other words, the quantities of the channels of a first convolution layer, a second convolution laver, . . . , an M-th convolution layer in the preset full convolution neural network model has the increasing trend (such as an inverted pyramid structure), the decreasing trend (such as a pyramid structure), or the trend of increasing first and then decreasing. Here, the M is an integer greater than or equal to 2, in this way the multi-scales convolution is realized, so that the convolution layers have the receptive fields of different sizes, and thus the different features are extracted, and the foundation for improving the scenario generalization ability and the stability of the scheme is laid.

In one specific example of the present disclosure, inputting the training voice signal to the preset full convolution neural network model for the model training includes: inputting the training voice signal to the preset full convolution neural network model to obtain the output result, and training the preset full convolution neural network model, based on a loss function. The loss function is constructed by the output result and a preset labeled voice signal.

Thus, completing the model training based on the constructed loss function lays a foundation for effectively completing the training of the preset full convolution neural network model.

In one specific example of the present disclosure, obtaining the preset labeled voice signal in the following manners.

A first manner includes calculating to obtain the preset labeled voice signal. based on the mixed voice signal and the total sample target voice signal (i.e., the sample target voice signal used for splicing), for example, taking an obtained ideal mask as the preset labeled voice signal through a mask manner such as Invariant Risk Minimization (IRM).

A second manner includes taking the total sample target voice signal directly as the preset labeled voice signal.

Thus, a foundation for effectively completing the training of the preset full convolution neural network model is laid.

It should be noted that, the preset labeled voice signal is related to the input training voice signal, in practical application, label data may be made based on the input training voice signal, then the loss function is constructed, and the operations of the model training are completed.

In one specific example of the present disclosure, in the process of the model training, an audio frame on which convolution processing is performed by a convolution layer in a. time dimension includes: a t-th audio frame at time t, a (t−1)-th audio frame at time t−1, and a (t−N)-th audio frame at time t-N. The N is related to a kernel characteristic of a convolution kernel of the convolution layer in the time dimension, and the N is an integer greater than or equal to 1; and the t is an integer greater than or equal to 1, and time t is the current time.

It should be noted that, in practical application, all the convolution layers in the preset full convolution neural network model may process the audio frames by adopting the above way, or, at least one of the layers processes the audio frames by adopting the above manner.

In this way, each convolution layer of the present disclosure may process normally and perform normal performance without relying on an audio frame at future time when performing the convolution processing. That is, when the convolution processing is performed on the t-th audio frame at the time t (i.e., the current time), the convolution processing depends on the (t−1)-th audio frame at the time t−1 to the (t−N)-th audio frame at time t−N, instead of depending on a (t−+1)-th audio frame at time t−1 (that is the future time of the current time), therefore, zero delay is realized during the convolution processing.

For example, as shown in FIG. 3, the time t is the current time, it is assumed that a kernel quantity of the convolution kernel in the time dimension is 3, at this time, as shown on the left side of FIG. 3, the convolution processing at the current time depends on the audio frames at time t−1 and the time t−1, therefore, the zero delay can't be achieved But, the present disclosure is shown on the right side of FIG. 3 the convolution processing at the current time depends on the audio frames at the time t−1, time t−2 and the current time (i.e., the time t), instead of depending on the audio frame at the time t+1, therefore, the present disclosure realizes the zero delay during the convolution processing.

In one specific example of the present disclosure, when a value of the t is 1, a 1-st audio frame represents a first audio frame in the intermediate processing signal, and a 0-th audio frame to a (1−N)-th audio frame are preset frames. That is, in order to ensure the zero delay in the convolution processing, in a case where the first audio frame is the audio frame at the current time, that is a case before the convolution processing is performed on the first audio frame by the convolution layers, since there are no other audio frames before the first audio frame, in order to ensure normal operation of convolution processing, N preset frames need to be added to make the convolution processing be performed on the added preset frame and the audio frame at the current time, to ensure the normal operation of convolution processing of convolution layers. In one specific example, the preset frames may be zero.

Further, the method further includes: setting the N preset frames before the first audio frame in the intermediate processing signal, to update the intermediate processing signal, so that the first N frames of the updated intermediate processing signal are the preset frames.

In this way, the normal operation of the convolution processing of convolution layers is ensured. Meanwhile, a convolution result only depends on historical time and the current time, instead of depending on the future time, thus the zero delay is realized.

It should be noted that, in practical application, the intermediate processing signal input to the preset full convolution neural network model is the updated signal, in other words, the intermediate processing signal input to the preset full convolution neural network model is the intermediate processing signal with N preset frames set in the above manner. For example, the updated intermediate processing signal is directly input to the preset full convolution neural network model, or an audio characteristic of the updated intermediate processing signal is input into the preset full convolution neural network model, so as to complete the training, ensure that the convolution processing in the process of the training does not depend on the future time, so as to achieve the zero delay.

It should be noted that, in an actual training process, before the convolution processing of each convolution layer, the N preset frames need to be preset according to the above manner, in this way, the normal operation of the convolution processing of convolution layers is ensured, meanwhile, the convolution result only depends on the historical time and the current time, without relying on the future time, thus the zero delay is realized.

In one specific example, the convolution layers described in the present disclosure may be specifically a MobileNet structure, in this way, grouping convolution is realized through the MobileNet, in this way, while ensuring an ability of extracting features, an amount of parameters is greatly reduced.

Figure 6A:
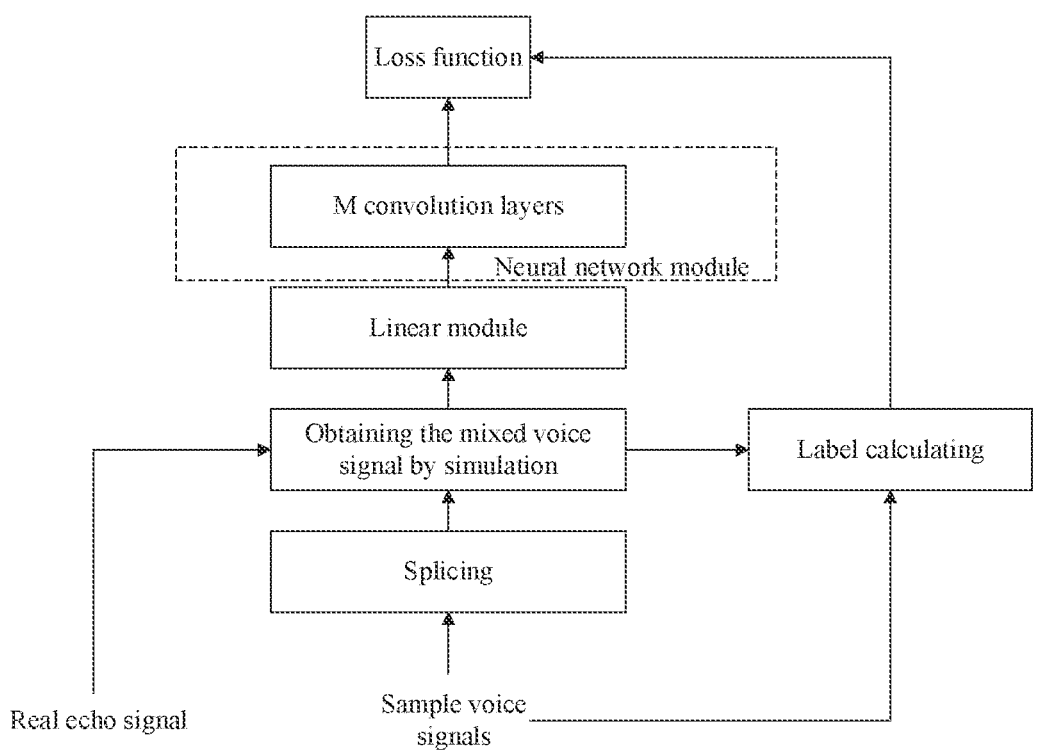
FIG. 6 (a) and FIG. 6 (b) are schematic diagrams of a processing flow of a model training method in one specific example according to embodiments of the present disclosure.
Figure 6B:
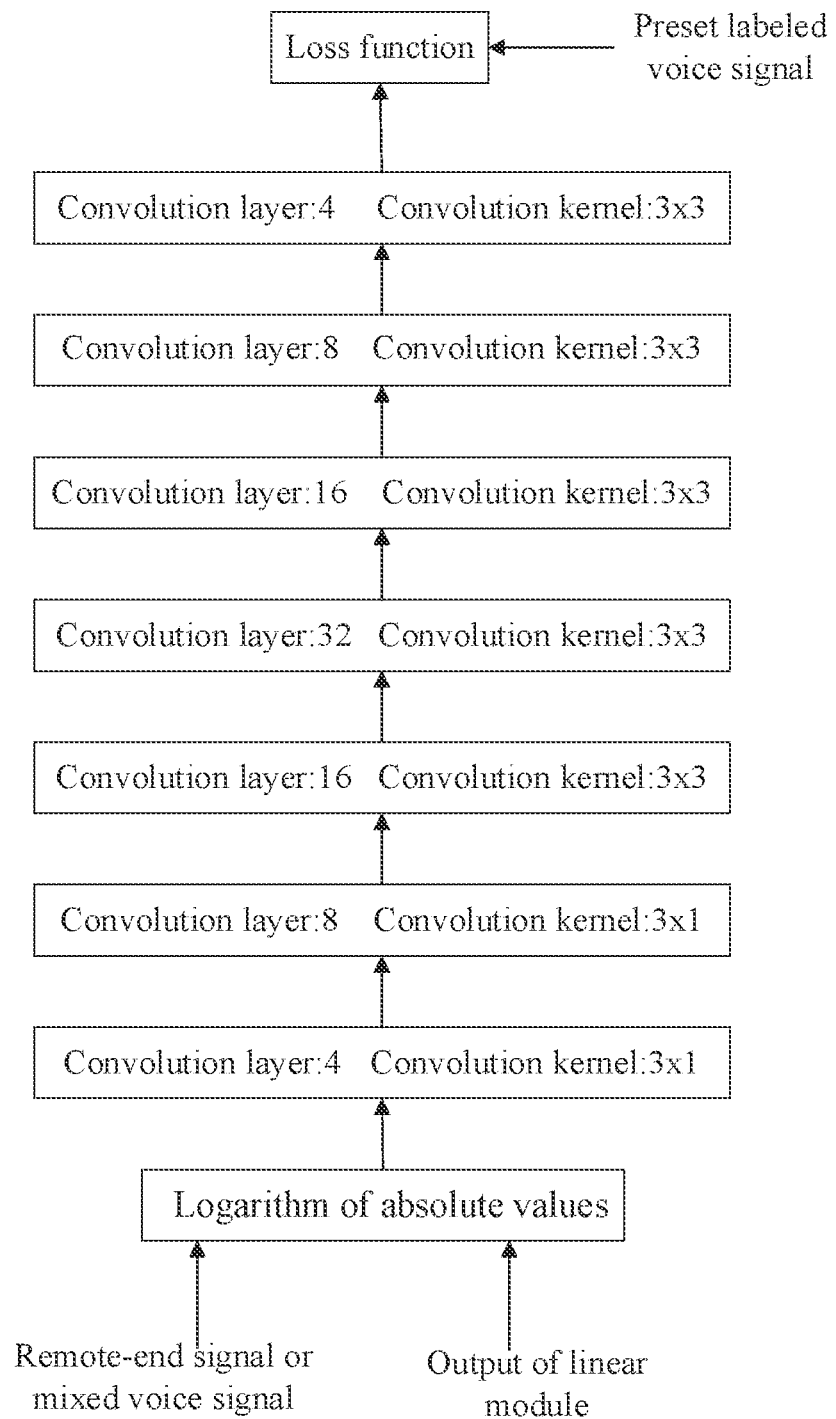

For example, as shown in FIG. 6 (a), main operations of the model training method of the present disclosure include: determining a plurality of sample voice signals to be trained, here, the sample voice signals may be interpreted as a near-end voice signal, for the training stage, the sample voice signals may also be called a sample target voice signal, that is a target voice signal taking as a sample; splicing the plurality of sample voice signals to obtain a total sample voice signal (i.e., the total sample target voice signal); superposing the total sample voice signal obtained after the splicing with a. real echo signal in a specific scenario to obtain the mixed voice signal by simulation, the real echo signal includes the linear echo part and the nonlinear echo part; inputting the obtained mixed voice signal and the remote-end signal used to generate the real echo signal into the linear module, and taking the input of the linear module and the remote-end signal as an input of the neural network module to train the neural network module.

Here, during the process of the training, it is also necessary to calculate a label signal (i.e., the preset labeled voice signal) based on the sample voice signals and the simulated mixed voice signal, in this way, the neural network model is optimized based on the constructed loss function (Loss), to complete the process of the model training.

Further, as shown in FIG. 6 (b), the neural network module, that is the preset full convolution neural network model, includes M convolution layers, each of which mainly uses the MobileNet structure, in order to be convenient to stack layers of different scales and save computing resources. Here, FIG. 6 (b) is only a structural example, in practical application, a quantity of convolution layers (i.e., filters) and the quantity of channels per layer, other settings, characteristics of the convolution kernel, and taking absolute value (Abs) and Log of input may be modified according to an actual situation. Experiments show that, the performance of the present disclosure is better than a single linear scheme or a single nonlinear scheme. Moreover, due to its strong generalization ability, the present disclosure only needs real echo data with a length of a few hours of a conventional scenario to make the performance of the model work normally.

After applying the present application to a smart speaker scenario, it is verified that, compared with a traditional nonlinear scheme, the present application improves voice recognition performance by 27.92%. Meanwhile, in order to evaluate the generalization ability of the present disclosure, an extreme scenario is also set (e.g. placing a smart speaker in in the box), at this time, compared with the traditional nonlinear scheme (because the process of the training does not simulate this scenario, an echo cannot be eliminated, and a result of voice recognition is the echo, instead of a voice command), the present disclosure reduces a quantity of echoes recognized from 67 times per hour to 2 times per hour.

It should be noted that, the mixed voice signal used in the process of the training can be simulated, and the closer the simulated mixed voice signal is to a real use scenario, the better the performance of the model, therefore, a recording equipment may be used to record real echo signals with a duration of about dozens or even hundreds of hours. Moreover, if it is desired to further improve the generalization ability of the model, more scenarios may be involved.

The present disclosure connects the linear module and the neural network module in series, thus may eliminate both a linear echo and a nonlinear echo, and directly improve accuracy of the voice recognition. Moreover, only a small amount of the training data may be used to achieve the generalization of each scenario, has the scenario generalization ability, also has the stable performance in the extreme scenario, improves user experience and reduces a collection demand for the training data, greatly saves time and labor cost. In addition, the present disclosure adopts a full convolution neural network model, compared with other network structures, the present disclosure does not limit a duration of audio data for training, moreover, there is no need to reset regularly. Meanwhile, since the convolution layer described in the present disclosure adopts the MobileNet structure, an amount of calculation is reduced, and computing resources is saved.

Figure 7:
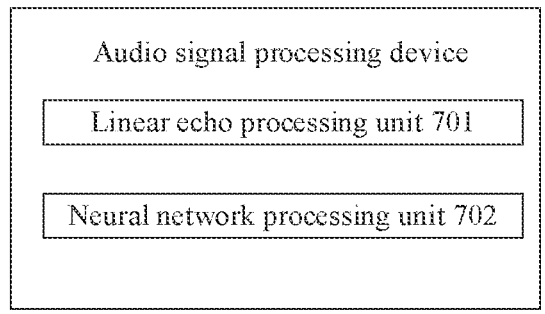
FIG. 7 is a schematic diagram of a structure of an audio signal processing device according to embodiments of the present disclosure.

The present disclosure also provides one audio signal processing device including the follows, as shown in FIG. 7.

A linear echo processing unit 701 is configured to eliminate at least part of a linear echo signal from a mixed voice signal, to obtain an intermediate processing signal, the mixed voice signal is obtained by mixing a target voice signal with an echo signal, and the echo signal is generated in an environment where the target voice signal is locates and includes a linear echo signal and a nonlinear echo signal.

A neural network processing unit 702 is configured to remove the nonlinear echo signal and a residual part of the linear echo signal from the intermediate processing signal by using a target full convolution neural network model, to obtain an approximate target voice signal, and the target full convolution neural network model includes at least two convolution layers.

In a specific example of the present disclosure the audio signal processing device also includes a recognition unit which is configured to perform voice recognition on the approximate target voice signal to obtain a control instruction indicated by the target voice signal, and respond to the control instruction.

In one specific example of the present disclosure, there are at least two convolution layers with different processing parameters in the target full convolution neural network model, and a processing parameter of a convolution layer includes at least one of a quantity of channels, or a convolution kernel.

In one specific example of the present disclosure, quantities of channels of the convolution layers contained in the target full convolution neural network model have one of: an increasing trend, a decreasing trend, or a trend of increasing, first and then decreasing.

In one specific example of the present disclosure, the neural network processing unit is specifically configured to input the intermediate processing signal to the target full convolution neural network model, or inputting an audio characteristic of the intermediate processing signal to the target full convolution neural network model.

A convolution layer in the target full convolution neural network model is able to perform convolution processing on an audio frame in the intermediate processing signal, and remove the nonlinear echo signal and the residual part of the linear echo signal from the intermediate processing signal.

In one specific example of the present disclosure, the audio frame on which the convolution processing is performed by the convolution layer in a time dimension includes: a t-th audio frame at time t, a (t−1)-th audio frame at time t−1, ..., and a (t−N)-th audio frame at time t−N. The N is related to a kernel characteristic of a convolution kernel of the convolution layer in the time dimension, and the N is an integer greater than or equal to 1; and the t is an integer greater than or equal to 1, and the time t is the current time.

In one specific example of the present disclosure, when a value of the t is 1, a 1-st audio frame represents a first audio frame in the intermediate processing signal, and a 0-th audio frame to a (1−N)-th audio frame are preset frames.

The device further includes a first updating unit configured to set the N preset frames before the first audio frame in the intermediate processing signal, to update the intermediate processing signal, so that the first N frames of the updated intermediate processing signal are the preset frames.

In one specific example of the present disclosure, the linear echo processing unit is specifically configured to estimate the approximate linear echo signal in the environment where the mixed voice signal is located, and eliminate the estimated approximate linear echo signal from the mixed voice signal, to obtain the intermediate processing signal.

In one specific example of the present disclosure, the linear echo processing unit is specifically configured to input a remote-end signal for generating the echo signal and the mixed voice signal into a linear echo model, to obtain the approximate linear echo signal.

The specific functions of each unit in the above device may refer to the relevant description of the above audio signal processing method, which will not be repeated here.

Figure 8:
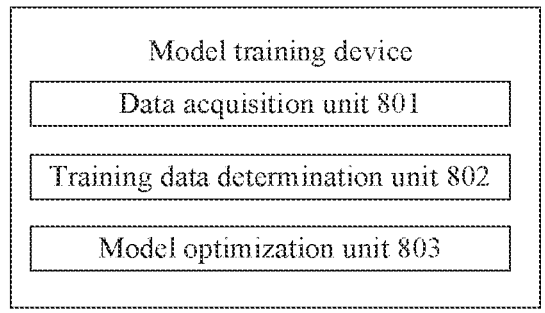
FIG. 8 is a schematic diagram of a structure of a model training device according to embodiments of the present disclosure.

The present application disclosure also provides a model training device including the follows, as shown in FIG. 8.

A data acquisition unit 801 is configured to acquire an intermediate processing signal obtained by eliminating at least part of a linear echo signal from a mixed voice signal, the mixed voice signal is obtained by mixing a total sample target voice signal with an echo signal, and the echo signal includes a linear echo signal and a nonlinear echo signal.

A training data determination unit 802 is configured to take at least the intermediate processing signal as a training voice signal.

A model optimization unit 803 is configured to input the training voice signal to a preset full convolution neural network model for model training, to obtain a target full convolution neural network model, the preset full convolution neural network model includes at least two convolution layers, and the target full convolution neural network model is able to remove the nonlinear echo signal and a residual part of the linear echo signal from the intermediate processing signal.

In one specific example of the present disclosure, the data acquisition unit is further configured to splice a plurality of sample target voice signals, to obtain the total sample target voice signal, and mix the total sample target voice signal with the echo signal, to obtain the mixed voice signal.

In one specific example of the present disclosure, the data acquisition unit is further configured to estimate an approximate linear echo signal in an environment where the mixed voice signal is located, and eliminate the estimated approximate linear echo signal from the mixed voice signal to obtain the intermediate processing signal.

In one specific example of the present disclosure, the data acquisition unit is specifically configured to input a remote-end signal for generating the echo signal and the mixed voice signal into the linear echo model to obtain the approximate linear echo signal.

In one specific example of the present disclosure, the training data determination unit is specifically configured to: take the intermediate processing signal and the mixed voice signal as the training voice signal, take an audio characteristic of the intermediate processing signal and an audio characteristic of the mixed voice signal as the training voice signal, take the intermediate processing signal and the remote-end signal as the training voice signal, or take an audio characteristic of the intermediate processing signal and an audio characteristic of the remote-end signal as the training voice signal. The remote-end signal is used to generate the echo signal.

In one specific example of the present disclosure, there are at least two convolution layers with different processing parameters in the preset full convolution neural network model, and a processing parameter of a convolution layer includes at least one of a quantity of channels, or a convolution kernel.

In one specific example of the present disclosure, quantities of channels of the convolution layers contained in the target full convolution neural network model have one of: an increasing trend, a decreasing trend, or a trend of increasing first and then decreasing.

In one specific example of the present disclosure, the model optimization unit is specifically configured to input the training voice signal to the preset full convolution neural network model, to obtain an output result, and train the preset full convolution neural network model, based on a loss function. The loss function is constructed by the output result and a preset labeled voice signal.

In one specific example of the present disclosure, the model optimization unit is further configured to calculate to obtain the preset labeled voice signal, based on the mixed voice signal and the total sample target voice signal, or take the total sample target voice signal as the preset labeled voice signal.

In one specific example of the present disclosure, in the process of the model training, an audio frame on which convolution processing is performed by a convolution layer in a time dimension includes: a t-th audio frame at time t, a (t−1)-th audio frame at time t−1, and a (t−N)-th audio frame at time t−N.

The N is related to a kernel characteristic of a convolution kernel in the time dimension, and the N is an integer greater than or equal to 1; and the t is an integer greater than or equal to 1, and the time t is the current time.

In one a specific example of the present disclosure, when a value of the t is 1, a 1-st audio frame represents a first audio frame in the intermediate processing signal, and a 0-th audio frame to a (1−N)-th audio frame are preset frames.

The device also includes a second updating unit configured to set the N preset frames before the first audio frame in the intermediate processing signal, to update the intermediate processing signal, so that the first N frames of the updated intermediate processing signal are the preset frames.

The specific functions of each unit in the above device can refer to the relevant description of the above model training method, which will not be repeated here.

Acquisition, storage and application of users' personal information involved in the technical scheme of the present application all comply with provisions of relevant laws and regulations, and do not violate public order and good customs.

According to embodiments of the present disclosure, the present disclosure also provides an electronic apparatus, a readable storage medium and a computer program product.

Figure 9:
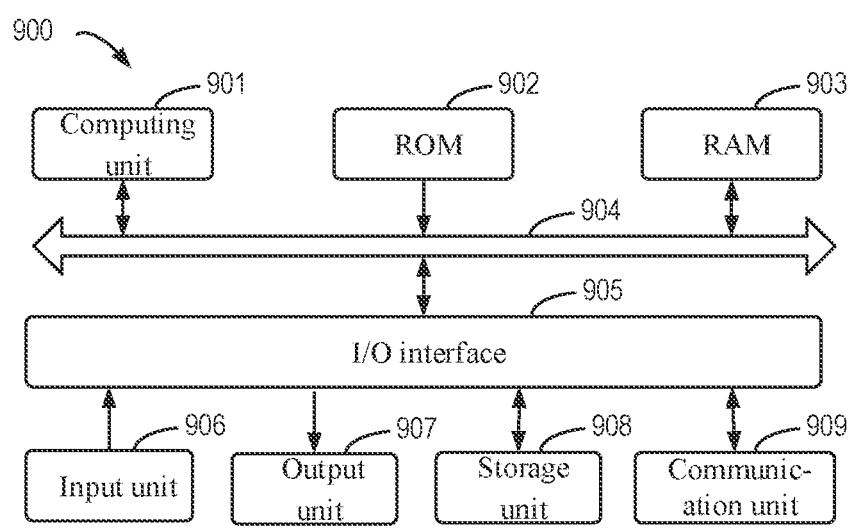
FIG. 9 is a block diagram of an electronic apparatus for implementing an audio signal processing method or a model training method according to embodiments of the present disclosure.

FIG. 9 shows a schematic block diagram of an example electronic apparatus 900 that may be used to implement embodiments of the present disclosure. The electronic apparatus is intended to represent various forms of digital computers, such as, a laptop, a desktop, a workstation, a personal digital assistant, a server, a blade server, a mainframe computer, and other suitable computers. The electronic apparatus may also represent various forms of mobile devices, such as, a personal digital processing, a cellular phone, a smart phone, a wearable apparatus and other similar computing devices. The components shown herein, their connections and relationships, and their functions are merely examples, and are not intended to limit the implementation of the present disclosure described and/or required herein.

As shown in FIG. 9, the apparatus 900 includes a computing unit 901 which may perform an appropriate action and an appropriate process based on a computer program stored in a read only memory (ROM) 902 or a computer program loaded into a random access memory (RAM) 903 from a storage unit 908. Various programs and data required for an operation of device 900 may also be stored in the RAM 903. The computing unit 901, the ROM 902 and the RAM 903 are connected to each other through a bus 904. An input/output (I/O) interface 905 is also connected to the bus 904.

The plurality of components connected to the I/O interface 905 in the apparatus 900 includes an input unit 906 such as a keyboard, a mouse, or the like, an output unit 907 such as various types of displays, speakers, or the like, the storage unit 908 such as a magnetic disk, an optical disk, or the like, and a communication unit 909 such as a network card, a modem, a wireless communication transceiver, or the like. The communication unit 909 allows the apparatus 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units running machine learning model algorithms, a digital signal processor (DSP), and any appropriate processors, controllers, microcontrollers, or the like. The calculation unit 901 performs various methods and processes described above, such as the audio signal processing method or the model training method. For example, in some implementations, the audio signal processing method or the model training method may be implemented as a computer software program, which is tangibly contained in a machine-readable medium, such as the storage unit 908. In some implementations, a part or all of the computer program may be loaded and/or installed on the apparatus 900 via the ROM 902 and/or the communication unit 909. When the computer program is loaded into the RAM 903 and executed by the calculation unit 901, one or more steps of the audio signal processing method or the model training method described above may be performed. Alternatively, in other implementations, the computing unit 901 may be configured to perform the audio signal processing method or the model training method by any other suitable means (e.g., by means of firmware).

Various implements of the system and technologies described above herein may be implemented in a digital electronic circuit system, an integrated circuit system, field programmable gate array (FPGA), an application specific integrated circuit (ASIC), a special standard product (ASSP), a system on chip (SOC), a load programmable logic device (CPLD), a computer hardware, firmware, software, and/or a combination thereof. These various implementations may include being implemented in one or more computer programs that may be executed and/or interpreted on a programmable system including at least one programmable processor, the programmable processor may be a special-purpose or general-purpose programmable processor, and may receive data and an instruction from a storage system, at least one input device, and at least one output device, and transmit the data and the instruction to the storage system, the at least one input device, and the at least one output device.

Program codes for implementing the methods of the present disclosure may be written in any combination of one or more programming languages. These program codes may be provided to a general-purpose computer, a special-purpose computer or other programmable data processing devices, enables the program codes, when executed by a processor or a controller, to cause the functions/operations specified in the flowcharts and/or block diagrams to be implemented. The program codes may be completely executed on a machine, partially executed on the machine, partially executed on the machine as a separate software package and partially executed on a remote machine, or completely executed on the remote machine or a server.

In the context of the present disclosure, the machine-readable medium may be a tangible medium, which may contain or store a procedure for use by or in connection with an instruction execution system, a device or an apparatus. The machine-readable medium may include, but is not limited to, an electronic medium, a magnetic medium, an optical medium, an electromagnetic medium, an infrared medium, or a semiconductor system, a semiconductor device, or a semiconductor apparatus, or any suitable combination of thereof. More specific examples of the machine-readable storage medium may include electrical connections based on one or more lines, a portable computer disk, a hard disk, a random access memory (RAM), a read only memory (ROM), an erasable programmable read only memory (EPROM or a flash memory)), optical fiber, a portable compact disk read only memory (CD-ROM), an optical storage device, a magnetic storage device, or any suitable combination of thereof.

In order to provide interaction with a user, the system and techniques described herein may be implemented on a computer, the computer has a display device (e.g., a cathode ray tube (CRT) or a liquid crystal display (LCD) monitor) for displaying information to the user, and a keyboard and a pointing device (e.g., a mouse or a trackball), the user may provide input to the computer through the keyboard and the pointing device. Other kinds of devices may also be used to provide interaction with user. For example, feedback provided to the user may be any form of sensory feedback (e.g., visual feedback, auditory feedback, or tactile feedback), and the input from the user can be received in any form (including an acoustic input, a voice input, or a tactile input).

The system and techniques described herein may be implemented in a computing system including a background component (e.g., as a data server), or a computing system including a middleware component (e.g., an application server), or a computing system including a front-end component (e.g., a user computer with a graphical user interface or a web browser, the user may interact with the implement of the system and technologies described herein through the graphical user interface or the web browser), or in a computing system including any combination of the background component, the middleware component, or the front-end component. The components of the system may be interconnected by digital data communication (e.g., a communication network) in any form or medium. Examples of the communication network include a local area network (LAN), a wide area network (WAN), and Internet.

A computer system may include a client and a server. The client and the server are generally far away from each other and usually interact with each other through a communication network. A relationship between the client and the server arises by a computer program running on a corresponding computer and having a client-server relationship with each other. The server may be a cloud server, a server of a distributed system, or a server combined with a block chain.

It should be understood that, the steps may be reordered, added or removed by using the various forms of the flows described above. For example, the steps recorded in the present disclosure can be performed in parallel sequentially or in different orders, as long as a desired result of the technical scheme disclosed in the present disclosure may be realized, which is not limited herein.

The above specific embodiments do not constitute a restriction on the protection scope of the present disclosure. Those skilled in the art should understand that, according to a design requirement and other factors, various modifications, combinations, sub combinations and substitutions may be made. Any modification, equivalent replacement, improvement or the like made within the spirit and principles of the present disclosure shall be included in the protection scope of the present disclosure.

What is claimed is:

1. An audio signal processing method, comprising:
eliminating at least part of a linear echo signal from a mixed voice signal, to obtain an intermediate processing signal; wherein the mixed voice signal is obtained by mixing a target voice signal with an echo signal, and the echo signal is generated in an environment where the target voice signal is located and comprises the linear echo signal and a nonlinear echo signal; and
removing the nonlinear echo signal and a residual part of the linear echo signal from the intermediate processing signal, by using a target full convolution neural network model, to obtain an approximate target voice signal, wherein the target full convolution neural network model comprises at least two convolution layers, and a convolution layer in the target full convolution neural network model is able to perform convolution processing on an audio frame in the intermediate processing signal and remove the nonlinear echo signal and the residual part of the linear echo signal from the intermediate processing signal;
wherein the audio frame on which the convolution processing is performed by the convolution layer in a time dimension comprises: a t-th audio frame at time t, a (t−1)-th audio frame at time t−1, . . . , and a (t−N)-th audio frame at time t−N; wherein the N is an integer greater than or equal to 1, the t is an integer greater than or equal to 1, and the time t is current time; and
in a case of a value of the t is 1, a 1-st audio frame represents a first audio frame in the intermediate processing signal, and a 0-th audio frame to a (1−N)-th audio frame are preset frames;
wherein the method further comprises: setting the N preset frames before the first audio frame in the intermediate processing signal, to update the intermediate processing signal, so that the first N frames of the updated intermediate processing signal are the preset frames; wherein for each convolutional layer after a first convolutional layer, before the convolution processing of the convolution layer, the N preset frames are set for the convolution layer, and the N is equal to a kernel quantity of a convolution kernel of the convolution layer in the time dimension minus 1.

2. The method of claim 1, further comprising:
performing voice recognition on the approximate target voice signal, to obtain a control instruction indicated by the target voice signal; and
responding to the control instruction.

3. The method of claim 1, wherein the at least two convolution layers in the target full convolution neural network model have different processing parameters, and a processing parameter of a convolution layer comprises at least one of a quantity of channels or a convolution kernel;
wherein in a case of the processing parameter of the convolution layer comprises the quantity of channels, quantities of channels of the convolution layers contained in the target full convolution neural network model have one of:
an increasing trend,
a decreasing trend, or
a trend of increasing first and then decreasing.

4. The method of claim 1, wherein removing the nonlinear echo signal and the residual part of the linear echo signal from the intermediate processing signal, by using the target full convolution neural network model, comprises:
inputting the intermediate processing signal to the target full convolution neural network model; or
inputting an audio characteristic of the intermediate processing signal to the target full convolution neural network model.

5. The method of claim 1, wherein eliminating the at least part of the linear echo signal from the mixed voice signal, to obtain the intermediate processing signal, comprises:
estimating an approximate linear echo signal in an environment where the mixed voice signal is located; and
eliminating the estimated approximate linear echo signal from the mixed voice signal, to obtain the intermediate processing signal;
wherein estimating the approximate linear echo signal in the environment where the mixed voice signal is located, comprises:
inputting a remote-end signal for generating the echo signal and the mixed voice signal to a linear echo model, to obtain the approximate linear echo signal.

6. An electronic apparatus, comprising:
at least one processor; and
a memory connected in communication with the at least one processor, wherein the memory stores an instruction executable by the at least one processor, and the instruction, when executed by the at least one processor, enables the at least one processor to execute the method of claim 1.

7. A non-transitory computer-readable storage medium on which a computer instruction is stored, wherein the computer instruction is used to cause a computer to execute the method of claim 1.

8. A model training method, comprising:
acquiring an intermediate processing signal obtained by eliminating at least part of a linear echo signal from a mixed voice signal; wherein the mixed voice signal is obtained by mixing a total sample target voice signal with an echo signal, and the echo signal comprises the linear echo signal and a nonlinear echo signal;
taking at least the intermediate processing signal as a training voice signal; and
inputting the training voice signal to a preset full convolution neural network model for model training, to obtain a target full convolution neural network model;
wherein the preset full convolution neural network model comprises at least two convolution layers, and the target full convolution neural network model is able to remove the nonlinear echo signal and a residual part of the linear echo signal from the intermediate processing signal;
wherein in a process of the model training, an audio frame of the intermediate processing signal on which convolution processing is performed by a convolution layer in a time dimension comprises: a t-th audio frame at time t, a (t−1)-th audio frame at time t−1, . . . , and a (t−N)-th audio frame at time t−N; wherein the N is an integer greater than or equal to 1, the t is an integer greater than or equal to 1, and the time t is current time; and
in a case of a value of the t is 1, a 1-st audio frame represents a first audio frame in the intermediate processing signal, and a 0-th audio frame to a (1−N)-th audio frame are preset frames;
wherein the method further comprises: setting the N preset frames before the first audio frame in the intermediate processing signal, to update the intermediate processing signal, so that the first N frames of the updated intermediate processing signal are the preset frames; wherein for each convolutional layer after a first convolutional layer, before the convolution processing of the convolution layer, the N preset frames are set for the convolution layer, and the N is equal to a kernel quantity of a convolution kernel of the convolution layer in the time dimension minus 1.

9. The method of claim 8, further comprising:
splicing a plurality of sample target voice signals, to obtain the total sample target voice signal; and
mixing the total sample target voice signal with the echo signal, to obtain the mixed voice signal.

10. The method of claim 8, further comprising:
estimating an approximate linear echo signal in an environment where the mixed voice signal is located; and
eliminating the estimated approximate linear echo signal from the mixed voice signal, to obtain the intermediate processing signal;
wherein estimating the approximate linear echo signal in the environment where the mixed voice signal is located, comprises:
inputting a remote-end signal for generating the echo signal and the mixed voice signal to a linear echo model, to obtain the approximate linear echo signal.

11. The method of claim 8, wherein taking at least the intermediate processing signal as the training voice signal comprises one of:
taking the intermediate processing signal and the mixed voice signal as the training voice signal,
taking an audio characteristic of the intermediate processing signal and an audio characteristic of the mixed voice signal as the training voice signal,
taking the intermediate processing signal and a remote-end signal as the training voice signal, or
taking an audio characteristic of the intermediate processing signal and an audio characteristic of a remote-end signal as the training voice signal;
wherein the remote-end signal is used to generate the echo signal.

12. The method of claim 8, wherein the at least two convolution layers in the preset full convolution neural network model have different processing parameters, wherein a processing parameter of a convolution layer comprises at least one of a quantity of channels, or a convolution kernel;
  wherein in a case of the processing parameter of the convolution layer comprises the quantity of channels, quantities of channels of the convolution layers contained in the preset full convolution neural network model have one of:
  an increasing trend,
  a decreasing trend, or
  a trend of increasing first and then decreasing.

13. The method of claim 8, wherein inputting the training voice signal to the preset full convolution neural network model for the model training comprises:
  inputting the training voice signal to the preset full convolution neural network model, to obtain an output result; and
  training the preset full convolution neural network model, based on a loss function, wherein the loss function is constructed by the output result and a preset labeled voice signal.

14. The method of claim 13, further comprising:
  calculating to obtain the preset labeled voice signal, based on the mixed voice signal and the total sample target voice signal; or
  taking the total sample target voice signal as the preset labeled voice signal.

15. An electronic apparatus, comprising:
  at least one processor; and
  a memory connected in communication with the at least one processor, wherein the memory stores an instruction executable by the at least one processor, and the instruction, when executed by the at least one processor, enables the at least one processor to execute the method of claim 8.

16. A non-transitory computer-readable storage medium on which a computer instruction is stored, wherein the computer instruction is used to cause a computer to execute the method of claim 8.

* * * * *